Nov. 21, 1950     T. D. PICKELL     2,531,294
HYDROCARBON CONVERSION
Filed Jan. 5, 1948
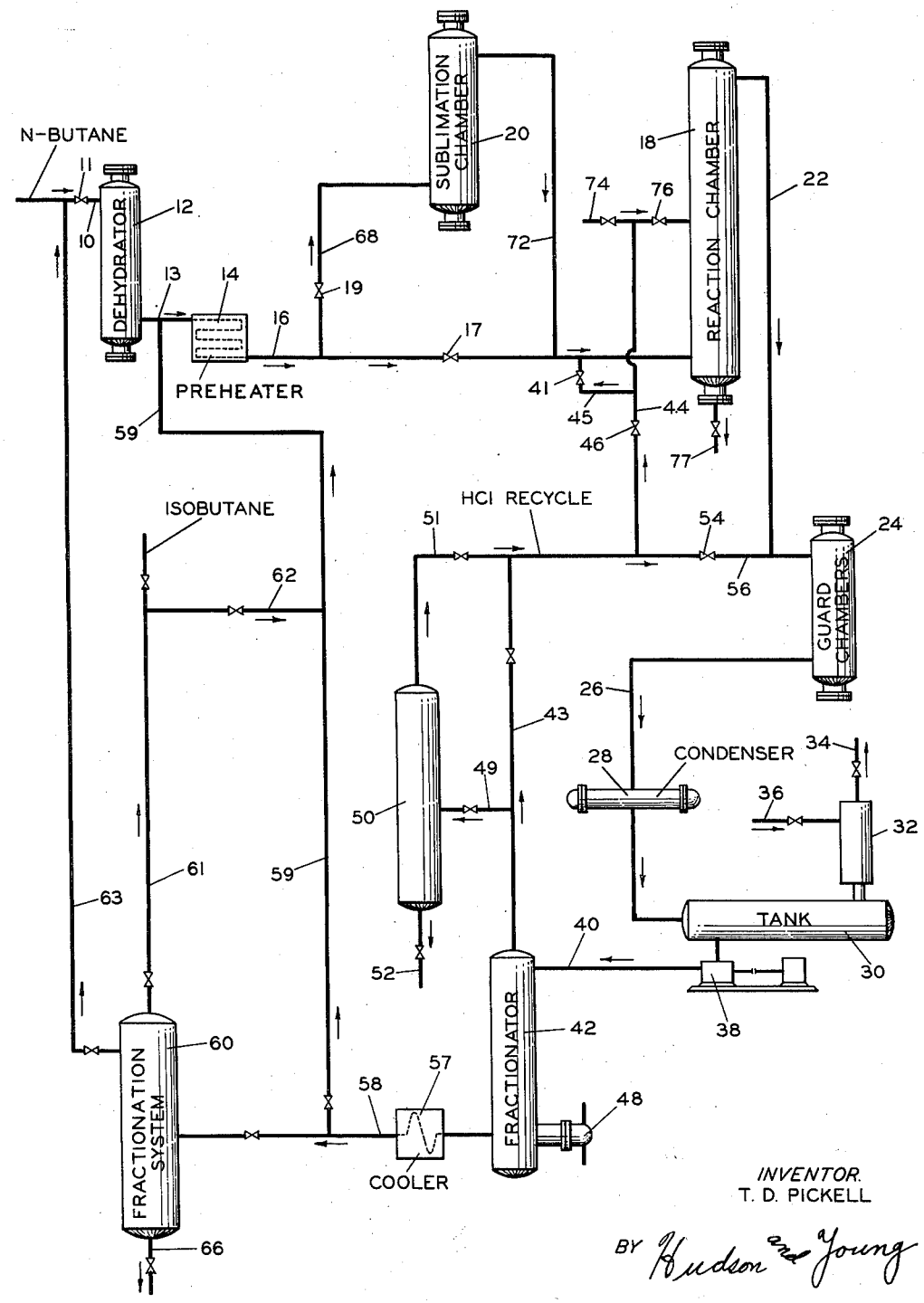
INVENTOR.
T. D. PICKELL
BY Hudson and Young
ATTORNEYS Patented Nov. 21, 1950

2,531,294

UNITED STATES PATENT OFFICE 2,531,294

HYDROCARBON CONVERSION

Thomas D. Pickell, Kansas City, Mo., assignor to Phillips Petroleum Company, a corporation of Delaware Application January 5, 1948, Serial No. 605

15 Claims. (Cl. 260—683.5)

This invention pertains to the conversion of hydrocarbons in the vapor phase over a supported Friedel-Crafts fugitive metal halide catalyst and to the preparation and restoration of such of catalyst in such a process. A specific aspect of the invention relates to the isomerization of saturated hydrocarbons in the presence of supported fugitive metal halide catalysts and to the preparation and restoration of catalysts of this type.

The conversion of hydrocarbons over metal halide catalysts supported on adsorptive carriers or extenders is a conventional commercial process. While a number of factors favor the use of aluminum chloride as the active catalyst and active alumina as the adsorbent support therefor, numerous other metal halides and adsorbents are conventional. Amongst the metal halides which have been suggested for use in such processes are the chlorides, bromides, and less frequently, the iodides of zinc, tin, arsenic, antimony, zirconium, beryllium, titanium, iron, molybdenum, boron, and the like. Adsorbents, in addition to alumina, which are known to function suitably as supports for metal halide catalysts in the conversion of hydrocarbons, include silica gel, synthetic metal oxide gels, adsorbent clays such as acid treated bentonite, fuller's earth, active carbon. pumice, etc. At least partially dehydrated aluminum oxides containing water of hydration, such as bauxite and precipitated aluminum hydroxide, are preferred alumina adsorbents for such catalysts as aluminum chloride. The common method of preparing the catalyst is by subliming the aluminum chloride into a carrier gas and passing the resulting stream through a bed of the adsorbent until a suitable amount of aluminum chloride or other metal halide has been deposited on the surface and in the pores of the adsorbent. Usually from about 1 per cent to 30 per cent aluminum chloride based on weight of the adsorbent is most effective as a catalyst.

Among the reactions catalyzed by supported Friedel-Crafts type metal halide catalysts are included cracking, reforming and polymerization of hydrocarbons. These catalysts are also active in alkylation, e. g., alkylation of isoparaffins with olefins, such as isobutane with ethylene to give diisopropyl or the alkylation of aromatics with olefins such as benzene with ethylene to give ethylbenzene. A conventional and important commercial process is the isomerization of saturated hydrocarbons including paraffins and naphthenes and, particularly, the vapor phase isomerization of normal butane to isobutane.

In order to simplify the explanation of the invention, application of the invention to the isomerization or normal butane to isobutane over a bauxite-aluminum chloride catalyst will be referred to from time to time, but it is to be understood that the invention is applicable to other hydrocarbon conversion processes and supported fugitive metal halide catalysts. In fact, the invention is applicable to any hydrocarbon conversion process which is effectively catalyzed by a fugitive metal halide catalyst distributed on solid adsorbents and wherein reaction and sludging occur during the restoration of the catalyst.

In effecting hydrocarbon conversion over a supported aluminum chloride catalyst, the activity of the catalyst gradually declines with use due to the formation of a sludge on the catalyst probably caused by reaction by the aluminum chloride and hydrocarbon to form a complex and also due to the loss of aluminum chloride from the adsorbent by sublination into the effluent from the reaction zone. It is conventional operating procedure to start the reaction in the presence of a fresh catalyst at as low a temperature as possible to obtain a desirable conversion rate, gradually increasing the temperature to maintain constant conversion as the activity of the catalyst decreases and then after the maximum permissible conversion temperature is attained, stopping the conversion and restoring the catalyst by reimpregnating the adsorbent with fresh sublimed aluminum chloride. This catalyst restoration is conventionally accomplished by passing the vaporized hydrocarbon feed in contact with a mass of solid aluminum chloride at a temperature sufficient to sublime the same and then passing the resultant aluminum chloride-rich vapors through the catalyst bed so as to reimpregnate the adsorbent or catalyst support. Generally, reactions of this type are effected with much better results in the presence of a catalyst promoter or activator. usually the hydrogen halide corresponding to the metal halide used in the process. The conversion phase of the cycle is terminated by stopping the flow of hydrogen halide into the reactor and then again initiating the process by resuming the flow of hydrogen halide into the catalyst bed after reimpregnation and restoration of the catalyst.

In cyclic processes of the type just described, numerous difficulties and problems are present, e. g., in the commercial isomerization of normal butane to isobutane over a metal halide-supported catalyst (aluminum chloride on adsorbent bauxite), the step of impregnating the adsorbent with aluminum chloride is performed by passing the normal butane feed stream through a sublimation chamber containing solid aluminum chloride and then passing the aluminum chloride-containing butane stream through the reaction chamber in contact with the adsorbent. It is found that the temperature in the sublimation chamber rises appreciably due to reaction of the feed in the presence of aluminum chloride, thereby forming sludge, a portion of which is carried over into the reaction chamber with resulting deterioration of the catalyst mass therein. This temperature rise and sludge formation due to reaction of the normal butane is not confined to the sublimation chamber, but progresses even more rapidly in the reaction chamber, thereby effecting even greater temperature rise therein with concomitant formation of sludge and proportionate deactivation of the catalyst.

Another difficulty encountered in conventional practice is the rapid rise in temperature when the HCl stream is cut back into the feed stream going into the reaction zone after restoration of the catalyst. It is common to experience a 90° F. rise in temperature over a two hour period during this phase of the cycle and, of course, the excessive temperature rise is due to the extremely rapid conversion of normal butane to isobutane taking place at this time with excessive production of sludge and deactivation of the catalyst. Naturally, this results in shorter catalyst life from one restoration period to the next and also hastens the time when the whole bed of catalyst including the absorbent must be dumped and replaced with a fresh bed of adsorbent, thereby decreasing the ultimate life of the adsorbent-supported catalyst.

The extreme variation in the ratio of normal to isobutane flowing through the system downstream of the reactor in conventional operation requires extremely close instrument control on the various apparatus, such as the deisobutanizer and the HCl stripper. It is also found that in conventional operation, a period for cooling the catalyst chamber after reimpregnation is required due to the temperature rise in the bed during reimpregnation and because of the necessity for dropping the temperature of the bed in accordance with the higher activity of the catalyst at this stage. It is apparent that this period required for cooling the catalyst bed shortens the per cent of time during a cycle devoted to conversion.

It is an object of the present invention to provide an improved method for the conversion of hydrocarbons in the presence of supported fugitive metal halide catalysts.

It is also an object of the invention to provide an improved method of preparing a supported metal halide catalyst.

Other objects of the invention are to provide more uniform temperature conditions during a cycle of operation, to lengthen the conversion phase of the cycle, to lengthen catalyst life between catalyst restorations, and to lengthen the ultimate life of the adsorbent-catalyst in vapor-phase hydrocarbon conversion processes effected in the presence of an adsorbent-supported metal halide catalyst.

Other objects of the invention will become apparent from a consideration of the accompanying disclosure.

The present invention provides for impregnation or restoration of the bed of adsorbent by passing therethrough sublimed aluminum chloride or other metal halide vapor entrained or dissolved in a carrier gas comprising an equilibrium concentration mixture of the feed gas to the process and the reaction product. To illustrate and clarify the invention, in the isomerization or conversion of normal butane to isobutane, instead of passing the normal butane feed through a sublimation chamber containing solid aluminum chloride, a mixture of butanes in the proportions found in the effluent from the reaction chamber during the conversion cycle is passed through the sublimation chamber and then through the reaction chamber so as to deposit the aluminum chloride in the adsorbent. It is also found that this method of impregnation is highly advantageous in preparing an adsorbent supported metal halide catalyst under conditions where the carrier gas is reactive in the presence of the catalyst such as is the case when utilizing hydrocarbons as the carrier gas. While the approximate equilibrium concentration of normal butane and isobutane is most advantageous, the use of other concentrations of these gases offers advantages over the use of straight normal butane. It is, of course, recognized that the equilibrium concentration will vary with reaction conditions to which normal butane is subjected in the reaction zone, and by "equilibrium concentration" is meant the concentration of normal butane and isobutane in the effluent from the reactor during the conversion cycle. Since an equilibrium concentration mixture of butanes will vary from a concentration of isobutane of about 30 to 70 per cent under different reaction conditions, admixtures within this range are preferred. However, advantages accrue from operating with an isobutane content as low as 10 per cent and as high as 90 per cent. It is found that when utilizing an equilibrium concentration of feed and product as a carrier gas for the metal halide during the catalyst restoration or reimpregnation step, temperature rise in the sublimation chamber and in the reaction chamber, as well as sludging in both chambers during this step, is substantially completely eliminated with material extension of the catalyst life during the conversion phase and consequent lengthening of the conversion phase as well as the total or ultimate life cycle of the adsorbent. These features of the invention obviously offer considerable economic advantage in commercial conversion of hydrocarbons in the presence of adsorbent-supported metal halide catalyst.

Further advantages of the invention lie in the elimination of the necessity for cutting off the flow of HCl through the reaction chamber along with the feed to the reaction chamber during the catalyst restoration phase. Since an equilibrium concentration mixture of normal butane and isobutane is used as the carrier gas, this results in the elimination of reaction of normal butane even in the presence of HCl. The continuous flow of HCl throughout the system during both phases of the cycle of operation simplifies the operation of the control instruments and likewise the maintenance of rather constant concentrations of butanes flowing through the system during both phases permits more uniform and effective control of the process.

Three methods of operation with respect to the HCl stream are feasible according to the invention. The flow of HCl can be cut off entirely during the catalyst restoration phase and then cut back into the feed at the end of this phase and during transition to the conversion phase without producing undue rise in the temperature in the reaction chamber and attendant sludging of the catalyst. It is found that when using this method of operation, it is advantageous to gradually cut down over a short period the isobutane concentration in the feed until this constituent of the carrier gas mixture is eliminated. Another modification is to introduce the HCl stream at some point downstream of the point of introduction of the feed to the reaction chamber thereby passing HCl through only a portion of the catalyst bed and avoiding the passage of HCl through the lower and normally more active portion of the bed. This modification maintains the reactor effluent constant and greatly facilitates smooth operation. According to a third modification, the HCl stream is passed into the metal halide-carrier gas stream as it enters the reaction chamber in about the same proportion thereto as to the feed during the conversion phase. The invention eliminates the necessity for purging HCl from the adsorbent which requires at least three to four hours in conventional operation and maintains normal flows through the unit thereby eliminating unusual fluctuations in fractionating towers' overhead and bottom streams.

In operating according to any one of the embodiments recited hereinabove, the amount of normal butane being introduced into the system during the subliming or catalyst restoration phase is reduced and this facilitates the unloading of the bottom of the deisobutanizer tower which has a tendency to cause trouble by overloading in commercial operation.

In order to obtain a more comprehensive understanding of the invention, reference is made to the drawing which is a diagrammatic representation of one flow embodiment adapted to the conversion of normal butane to isobutane. It will be appreciated that numerous auxiliary items of equipment such as heat exchangers, flow controllers, temperature and pressure controllers, pumps, and the like are not included in the drawing for the sake of simplicity as the necessity for such items is realized by one skilled in the art.

Referring to the drawing, normal butane feed is introduced via line 10 to dehydrator 12 which may, for example, be filled with dehydrated bauxite. The dried stream then passes via line 13 through a conventional preheater 14 and then via line 16 into the bottom of one or more reaction chambers represented by tower 18. Reaction chamber 18 is filled with dehydrated bauxite or any other suitable adsorbent capable of adsorbing and desorbing aluminum chloride. Some aluminum chloride may be admixed with the adsorbent prior to the first use of the catalyst or all of the aluminum chloride content of the reaction chamber may be sublimed from subliming chamber 20. The reaction is effected in the vapor phase and at superatmospheric pressures in the range of about 150 to 400 p. s. i. g. and at temperatures in the range of about 190° to 350° F. The isomerization effluents pass from chamber 18 via line 22 through one or more guard chambers 24 which may contain a bed of adsorbent such as dehydrated bauxite for adsorbing traces of aluminum chloride carried out of the reactors, or which may comprise a sulfuric acid scrubber or any other suitable means for removing entrained aluminum chloride from the effluent stream. Effluents then pass through line 26 into condenser 28 where they are condensed to a liquid which flows into stripper feed tank 30. Light gases including hydrogen, methane, ethane, and propane tend to accumulate in the system and these are intermittently or continuously bled off the vapor phase of tank 30 through an absorber 32 and exit through vent 34. A small stream of liquid normal butane is introduced into the top of absorber 32 through line 36 for dissolving HCl from the light gases and returning same to tank 30. Pump 38 is used to pass liquid from tank 30 via line 40 into the top of fractionating column 42. This column serves to strip the hydrogen chloride from the condensed isomerization effluents and the hydrogen chloride recovered passes overhead through line 43 and valve 46 in line 44 either into line 16 via line 45 or into reaction chamber 18 directly, via line 74. Line 74 may be placed at any suitable point along reaction chamber 18 downstream of line 16 or it may comprise a series of spaced lines along the reaction chamber for multipoint injection of hydrogen chloride. Alternatively, the HCl stream in line 43 may be passed via line 49 into tower 50 for separation of any entrained hydrocarbons from the stream, the hydrocarbons being removed via line 52 and the HCl recycle continuing via line 51.

Column 42 is provided with the usual reboiler 48 and the HCl-free hydrocarbon kettle product passes via line 58 through cooler 57 to caustic treatment (not shown) and subsequent fractionation in unit 60. This fractionation effects separation if isobutane product which is taken off via line 61 and may be recovered directly or recycled through lines 62 and 59 to line 13 upstream of preheater 14 where the stream is mixed with normal butane and raised to the proper temperature for passage through the sublimation chamber 20 via line 68. The preferred temperature for sublimation is in the range of about 290° to 310° F., although slightly higher and lower temperatures may be used. Separated normal butane is passed via line 63 to join line 10 for recycling through the system. C₅'s and heavier hydrocarbons are withdrawn from fractionator 60 via line 66.

Alternatively, the acid-free mixture of normal butane and isobutane in line 58 may be recycled via line 59 to line 13 (preferably after caustic treatment) for reheating in heater 14 and passage via lines 16 and 68 through sublimation chamber 20, in which case valve 11 in line 10 is controlled either to shut off completely the supply of normal butane during the sublimation step or regulated to admit a small amount of normal butane into admixture with the recycled mixture from line 59 in order to vary the concentration of the recycled mixture. When additional isobutane is required, this can be admitted to line 13 through a line not shown from any suitable source.

When a conversion period has been completed, if it is desired to cut the flow of HCl through reaction chamber 18, valve 46 is closed and valve 54 is opened allowing all of the HCl in recycle lines 43 or 51 to bypass the catalyst chamber via line 56 which leads into guard chambers 24. Line 56 may alternatively lead into line 26 just ahead of condenser 28. In operation where it is desired to discontinue the flow of HCl into the reaction chamber along with the feed and flow HCl into any portion of the chamber through line 74, valve 41 in line 45 is closed and valve 76 in line 74 is opened. When operating according to the third modification of HCl introduction, valves 46 and 41 are operated the same as in the conversion phase of the cycle with HCl passing through lines 44 and 45 into line 16. Valve 17 in line 16 is closed and valve 19 in line 68 is opened so as to shut off the direct flow of feed to the reaction chamber and pass the normal butane-isobutane mixture through sublimation chamber 20 and back to line 16 via line 72. During sublimation, the major portion of the normal butane-isobutane stream may be passed through chamber 20 and a smaller stream may be passed through valve 17 to bypass chamber 20 and adjust the concentration of aluminum chloride in the carrier stream going into reaction chamber 20.

In the transition from the catalyst restoration phase to the conversion phase of the operating cycle, since the temperature of the catalyst bed at the end of the former is around 300° F., the temperature of the feed to the reactor should be reduced below the usual starting temperature of about 230° F. until the temperature of the bed is reduced to the desired operating range. This temperature change within the bed is advantageously effected while gradually increasing the butane concentration in the feed without appreciable loss in yield.

Other modifications in operation, in apparatus, and in arrangement of apparatus are available within the scope of the invention, as will be apparent to those skilled in the art.

In commercial operation of a butane isomerization plant taking a charge of 2000 B./D. of feed consisting of 98 per cent normal butane and 2 per cent isobutane and utilizing an active bauxite impregnated with AlCl₃ as the catalyst in fixed bed reactors and operating with a feed inlet temperature of about 230° to about 290° F. and pressure of 250 p. s. i. g. so as to maintain about 55 per cent conversion to isobutane, it is found that when utilizing the feed as the carrier gas at a temperature of approximately 300° F. for the AlCl₃ sublimation and impregnation phase of the cycle, a rise of 10° F. occurs in the sublimation chamber between feed and effluent temperatures attributed to conversion of normal butane to isobutane in the presence of the AlCl₃ and results in some sludge formation. When using an equilibrium concentration mixture of 45 per cent normal butane and 55 per cent isobutane as the carrier gas during sublimation, no temperature rise occurs in the sublimation chamber.

During the impregnation step the passage of the feed carrying AlCl₃ into the bauxite adsorbent in the reactor effects a temperature rise through the bed of about 20° F. and conversion of about 10 per cent of the feed to isobutane. The formation of sludge during this phase is, of course, detrimental to the activity and life of the catalyst. When the sublimation and impregnation phase is operated with an equilibrium concentration mixture of butanes as the carrier gas, no temperature rise occurs in the reactor and sludging is entirely eliminated during this step.

In operation of the plant in conventional manner HCl feed to the reactor is cut off during the sublimation and catalyst restoration phase and then cut in again at the end of this phase and the initiation of the conversion phase. In spite of careful control of the HCl stream during the cutting in step, a rise of about 90° F. through the bed occurs and persists over about a 2-hour period with attendant high rate of conversion and excessive sludging of the catalyst.

In contrast to conventional operation, restoration of the catalyst using an equilibrium concentration mixture of butanes followed by cutting in the HCl at the resumption of conversion is accompanied by only a normal temperature rise of about 50° F. Reaction progresses normally with a conversion of about 55 per cent of n-butane to isobutane and excessive deactivation of the catalyst is avoided.

In operation of the butane isomerization plant without cutting off the flow of HCl through the reactor during the catalyst restoration or reimpregnation phase, using an equilibrium concentration mixture of butanes carrying sublimed AlCl₃, the transition from the catalyst restoration to the conversion phase is effected by gradually cutting off the isobutane recycle over a period of about ½ hour without abnormal temperature rise through the catalyst bed. A shorter or longer period for the transition from one phase to the other in this modification of the invention can be used without ill effects to the catalyst, e. g., 15 minutes to 1 hour is suitable.

It is found that when operating according to the invention in any of its modifications, catalyst life per cycle, as well as ultimate catalyst life, is increased at least 10 per cent and, under optimum conditions, as much as 20 per cent. Moreover, the proportion of the operation cycle devoted to conversion is substantially increased due to elimination of the necessity for purging the reactor.

Operation in accordance with the invention permits smoother operation of the fractionator system. By maintaining the isobutane concentration in the reactor effluent substantially constant during the entire operation cycle the fractionating columns operate smoothly and do not require close control. Smoother operation also results from elimination of excessive temperature fluctuations in the reactor during the transition from the catalyst restoration phase to the conversion phase of the cycle when operating conventionally.

The foregoing application of the invention to isomerization of normal butane in the presence of AlCl₃ deposited on an active bauxite adsorbent is merely illustrative and should not be construed as unduly limiting the invention which is limited only by the scope of the appending claims.

I claim:

1. A process for vapor-phase conversion of normal butane to isobutane in the presence of HCl and a supported AlCl₃ catalyst, which comprises passing normal butane with a promoting amount of HCl in contact with a mass of AlCl₃-impregnated adsorbent in a conversion zone maintained at a temperature between 190 and 350° F. and a pressure between 150 and 400 p. s. i. g. so as to convert normal butane to isobutane, thereby gradually decreasing catalytic activity of said mass; when the catalyst activity declines to a predetermined level, passing a mixture of normal and isobutane having substantially the concentration of normal butane and isobutane therein as exists in the effluent from the conversion zone during the conversion cycle through a sublimation zone in contact with a mass of AlCl₃ at a temperature within said range so as to entrain sublimed AlCl₃; passing the resulting AlCl₃-containing mixture through said conversion zone in contact with said mass so as to substantially restore the catalyst therein; thereafter, again passing normal butane and HCl through said conversion zone under the conditions aforesaid.

2. The process of claim 1 in which the proportions of normal and isobutane in said mixture are in the range of 30 to 65 per cent and 70 to 35 per cent, respectively.

3. The process of claim 1 in which HCl is passed through at least a portion of the conversion zone during the catalyst restoration step.

4. A process for effecting vapor-phase hydrocarbon conversion in the presence of a hydrogen halide and a fugitive metal halide catalyst of the Friedel-Crafts type capable of being desorbed from and adsorbed by a solid adsorbent, which comprises passing vaporous hydrocarbon feed to be converted and a promoting amount of hydrogen halide through a conversion zone under reaction conditions of time, temperature, and pressure in contact with a bed of adsorbent impregnated with metal halide so as to produce an effluent comprising unreacted hydrocarbon and a conversion product, whereby the catalyst gradually decreases in activity; thereafter, passing a mixture of said hydrocarbon and said conversion product in which said hydrocarbon and said conversion product are present in substantially the same concentration as in the effluent from the conversion zone during the conversion cycle carrying sublimed metal halide in contact with said adsorbent in said conversion zone so as to substantially restore the catalytic activity thereof; continuing the passing of hydrogen halide through at least a portion of said conversion zone during the catalyst restoration step; and again passing hydrocarbon feed through said conversion zone under conversion conditions in contact with the restored catalyst therein.

5. The process of claim 4 in which at the end of the catalyst restoration step the metal halide in said mixture is gradually eliminated and thereafter said product is gradually eliminated from said mixture as a transition step to the conversion step.

6. A process for effecting vapor phase hydrocarbon conversion in the presence of a hydrogen halide and a fugitive metal halide catalyst of the Friedel-Crafts type capable of being desorbed from and adsorbed by a solid adsorbent, which comprises passing gaseous hydrocarbon feed to be converted, together with a promoting amount of hydrogen halide, through a conversion zone under reaction conditions of time, temperature, and pressure in contact with a bed of adsorbent impregnated with metal halide, so as to produce an effluent comprising said hydrocarbon and a conversion product, whereby the catalytic activity of said bed gradually decreases; thereafter, passing a mixture of said hydrocarbon and said conversion product in which said hydrocarbon and said conversion product are present in substantially the same concentration as in the effluent from the conversion zone during the conversion cycle carrying sublimed metal halide through said conversion zone in lieu of said hydrocarbon feed so as to substantially restore the catalytic activity of said bed; again passing said gaseous hydrocarbon feed through said conversion zone in the presence of a promoting amount of hydrogen halide.

7. The process of claim 6 in which the sublimed metal halide is admixed with said mixture by passing the same in contact with a mass of solid metal halide.

8. The process of claim 6 in which said gaseous hydrocarbon is a paraffinic hydrocarbon, said hydrogen halide is HCl, and said metal halide is $AlCl_3$.

9. In a process for isomerizing normal butane to isobutane comprising passing gaseous normal butane through a reaction zone in contact with a bed of $AlCl_3$-impregnated adsorbent catalyst in the presence of a promoting amount of HCl and under isomerizing conditions, wherein the activity of said catalyst gradually declines due to depletion and sludging; periodically diverting flow of normal butane feed to a sublimation zone so as to contact a bed of $AlCl_3$ therein under temperature and pressure conditions adapted to sublime and entrain $AlCl_3$ vapors; passing the resulting $AlCl_3$-containing stream through said reaction zone in contact with said bed of adsorbent for a time and under temperature and pressure conditions adapted to reimpregnate and substantially restore the catalytic activity of said bed; thereafter diverting flow of normal butane from said sublimation zone directly to said reaction zone and continuing the isomerization therein until catalyst activity has declined substantially; the improvement which comprises utilizing as $AlCl_3$-carrier gas in the reimpregnation step a mixture of normal and isobutane which contains between about 10 and 90 per cent isobutane the concentration of the normal butane and isobutane in the mixture as used being substantially the same as the concentration of said normal butane and isobutane in the effluent from the reaction zone during the conversion cycle.

10. In the vapor phase conversion of hydrocarbons comprising alternately contacting a solid adsorbent impregnated with a fugitive metal halide with a stream of hydrocarbon in the presence of a promoting amount of a hydrogen halide under conditions effecting conversion thereof and then with a stream of carrier gas containing sublimed metal halide so as to reimpregnate said adsorbent, the improvement which comprises utilizing as said carrier gas a mixture of said hydrocarbon and a hydrocarbon product of said conversion said mixture containing said hydrocarbon and hydrocarbon product in substantially the same proportion as said hydrocarbon and hydrocarbon product are contained in the effluent of the vapor phase conversion.

11. In the vapor phase conversion of normal butane to isobutane comprising alternately contacting a solid adsorbent impregnated with $AlCl_3$ with a stream of normal butane in the presence of a promoting amount of HCl under conditions effecting conversion thereof to isobutane and then with a stream of carrier gas containing sublimed aluminum chloride so as to reimpregnate said adsorbent, the improvement which comprises utilizing as said carrier gas a mixture of said butanes in which the normal and isobutane are present in substantially the same proportion as said normal and isobutane are present in the effluent of the vapor phase conversion.

12. In the vapor phase conversion of normal butane to isobutane comprising alternately contacting a solid adsorbent impregnated with $AlCl_3$ with a stream of normal butane in the presence of a promoting amount of HCl under conditions effecting conversion thereof to isobutane, with concomitant decrease in catalyst activity, and then with a stream of carrier gas containing sublimed $AlCl_3$ so as to reimpregnate said adsorbent and substantially restore catalytic activity thereof, the improvement which comprises passing a mixture of normal and isobutane in which the normal and isobutane are present in substantially the same proportion as said normal butane and isobutane are present in the effluent of the vapor phase conversion of said normal butane in contact with a mass of solid AlCl₃ so as to sublime and entrain same, then passing the resulting AlCl₃-containing stream in contact with said adsorbent so as to reimpregnate same, and then passing a stream of normal butane in contact with the reimpregnated adsorbent under isomerizing conditions.

13. In a method of preparing a catalyst by impregnating a solid adsorbent with a metal halide of the Friedel-Crafts type wherein said metal halide is sublimed by contacting same with a stream of hot hydrocarbon vapor as a carrier gas and said adsorbent is then contacted with the resulting metal halide-containing hydrocarbon and wherein said hydrocarbon reacts in the presence of said metal halide to form a hydrocarbon product and sludge with said metal halide, the improvement which comprises utilizing as said carrier gas a mixture of said hydrocarbon and said hydrocarbon product in which mixture the said hydrocarbon and the said hydrocarbon product are present in substantially the same proportion as said hydrocarbon and said hydrocarbon product are present in the effluent resulting from the hydrocarbon reaction in presence of said metal halide.

14. In a method of preparing a catalyst by impregnating a solid adsorbent with a metal halide of Friedel-Crafts type wherein said metal halide is sublimed by contacting same with a stream of hot normal paraffin vapor as a carrier gas and said adsorbent is then contacted with the resulting metal halide-containing paraffin and wherein said paraffin reacts in the presence of said metal halide to form the corresponding isoparaffin and sludge with said metal halide, the improvement which comprises utilizing as said carrier gas a mixture of said normal paraffin and said isoparaffin in which mixture the said normal paraffin and the said isoparaffin are present in substantially the same proportion as the said normal paraffin and the said isoparaffin are present in the effluent from the reaction of said paraffin in the presence of said metal halide.

15. In the method of preparing a catalyst by impregnating a solid adsorbent with aluminum chloride wherein said aluminum chloride is sublimed by contacting same with a stream of hot normal butane vapor as a carrier gas and said adsorbent is then contacted with the resulting aluminum chloride-containing normal butane stream and wherein said normal butane reacts in the presence of said aluminum chloride to form isoparaffin and sludge with said aluminum chloride, the improvement which comprises utilizing as said carrier gas a mixture of said butanes in which mixture butane and said isoparaffin are present in substantially the same proportion as said butane and said isoparaffin are present in the effluent resulting from the reaction of said normal butane in the presence of said aluminum chloride.

THOMAS D. PICKELL.

REFERENCES CITED

The following references are of record in the file of this patent:

UNITED STATES PATENTS

| Number | Name | Date |
|---|---|---|
| 2,407,488 | Franklin | Sept. 10, 1946 |
| 2,447,573 | Gerbes | Aug. 24, 1948 |